United States Patent
Lim et al.

(10) Patent No.: US 9,513,894 B2
(45) Date of Patent: Dec. 6, 2016

(54) DATABASE SOFTWARE UPGRADE USING SPECIFY-VALIDATE-EXECUTE PROTOCOL

(75) Inventors: Steven S. H. Lim, Amherst, NH (US); Joydip Kundu, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/600,786

(22) Filed: Aug. 31, 2012

(65) Prior Publication Data

US 2014/0068584 A1    Mar. 6, 2014

(51) Int. Cl.
*G06F 9/44* (2006.01)
*G06F 9/445* (2006.01)
*G06F 11/14* (2006.01)
*G06F 11/20* (2006.01)

(52) U.S. Cl.
CPC ............ *G06F 8/65* (2013.01); *G06F 11/1433* (2013.01); *G06F 11/2094* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 5,485,608 A | 1/1996 | Lomet et al. | |
| 6,490,722 B1 * | 12/2002 | Barton | G06F 11/1417 348/E5.103 |
| 6,532,494 B1 | 3/2003 | Frank et al. | |
| 6,618,822 B1 | 9/2003 | Loaiza et al. | |
| 6,871,222 B1 | 3/2005 | Frank et al. | |
| 6,963,957 B1 | 11/2005 | Kundu et al. | |
| 7,020,695 B1 | 3/2006 | Kundu et al. | |
| 7,076,783 B1 | 7/2006 | Frank et al. | |
| 7,082,435 B1 | 7/2006 | Guzman et al. | |
| 7,222,136 B1 | 5/2007 | Brown et al. | |

(Continued)

OTHER PUBLICATIONS

Oracle Database Upgrade Guide 10g Release 2 (10.2) B14238, Jan. 2008.*

(Continued)

*Primary Examiner* — Wei Zhen
*Assistant Examiner* — Timothy Duncan
(74) *Attorney, Agent, or Firm* — Vista IP Law Group, LLP (57) ABSTRACT

A method, system, and computer program product for upgrading high-availability database systems. The method commences by specifying a subject database configuration state (e.g., an initial state) as well as an upgraded database configuration state (e.g., an upgraded state). Then, the method performs operations for compiling the specifications and validating the upgraded database configuration state with respect to the specified subject database configuration state. Compile errors are reported and a user can change the specifications. Once the compiler determines that the upgraded configuration state can be reached from the subject database configuration state, then the method generates an upgrade plan. The upgrade plan is executed by a computer-implemented controller. During execution of the plan, the controller pauses for accepting user intervention at key execution points. The controller monitors state changes to establish checkpoints. In the event of execution errors detected during execution of the plan, corrective action reports are output.

20 Claims, 7 Drawing Sheets

(56) References Cited

U.S. PATENT DOCUMENTS

| | | |
|---|---|---|
| 7,236,993 B2 | 6/2007 | Brown et al. |
| 7,310,653 B2 * | 12/2007 | Coyle et al. |
| 7,363,538 B1 | 4/2008 | Kundu et al. |
| 7,406,486 B1 | 7/2008 | Kundu et al. |
| 7,464,113 B1 | 12/2008 | Girkar et al. |
| 7,617,175 B1 * | 11/2009 | Mouton et al. |
| 7,617,254 B2 | 11/2009 | Loaiza et al. |
| 7,664,795 B2 * | 2/2010 | Balin et al. ............... 707/661 |
| 7,840,603 B2 * | 11/2010 | Huang et al. ............. 707/802 |
| 7,890,466 B2 | 2/2011 | Kundu et al. |
| 7,996,363 B2 | 8/2011 | Girkar et al. |
| 8,086,564 B2 | 12/2011 | Kundu et al. |
| 8,117,153 B2 | 2/2012 | Cattell et al. |
| 8,676,752 B2 | 3/2014 | Kundu et al. |
| 2002/0165944 A1 * | 11/2002 | Wisner et al. ............ 709/220 |
| 2004/0030954 A1 | 2/2004 | Loaiza et al. |
| 2004/0210577 A1 | 10/2004 | Kundu et al. |
| 2005/0262170 A1 | 11/2005 | Girkar et al. |
| 2006/0004838 A1 | 1/2006 | Shodhan et al. |
| 2006/0015542 A1 | 1/2006 | Pommerenk et al. |
| 2007/0192290 A1 * | 8/2007 | Zaytsev et al. ............... 707/3 |
| 2007/0192384 A1 | 8/2007 | Shodhan et al. |
| 2008/0162590 A1 | 7/2008 | Kundu et al. |
| 2008/0301489 A1 * | 12/2008 | Li .................. G06F 11/2041 714/4.12 |
| 2009/0157764 A1 | 6/2009 | Kundu et al. |
| 2011/0106778 A1 | 5/2011 | Chan et al. |
| 2012/0041926 A1 | 2/2012 | Kundu et al. |
| 2012/0054533 A1 | 3/2012 | Shi et al. |
| 2012/0059792 A1 | 3/2012 | Kundu et al. |
| 2014/0258224 A1 | 9/2014 | Song et al. |

OTHER PUBLICATIONS

Oracle, Database Rolling Upgrade Using Transient Logical Standby Oracle Database 10g Release 2, Aug. 2010.*
Wolski et al., "Rolling Upgrades for Continuous Services", First International Service Availability Symposium, ISAS 2004, Munich, German, May 13-14, 2004, pp. 175-189.*
Non-final Office Action dated Dec. 4, 2014 for U.S. Appl. No. 13/794,112.
Non-final Office Action dated Jul. 31, 2015 for related U.S. Appl. No. 13/794,112.
Final Office Action dated Feb. 16, 2016 for related U.S. Appl. No. 13/794,112.
Advisory Action dated May 11, 2016 for related U.S. Appl. No. 13/794,112.
Notice of Allowance and Fee(s) due dated Jul. 1, 2016 for related U.S. Appl. No. 13/794,112.

* cited by examiner

DATABASE SOFTWARE UPGRADE USING SPECIFY-VALIDATE-EXECUTE PROTOCOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of high-availability database systems and more particularly to techniques for database software upgrades using a specify-validate-execute protocol.

BACKGROUND

Some embodiments of the present disclosure are directed to an improved approach for implementing database software upgrades using a specify-validate-execute protocol.

Databases comprise the actual storage on a physical storage device (e.g., a disk drive), which works in combination with corresponding software. In exemplary scenarios, a database comprises tables and records that are laid out in an ordered sequence of bytes. A software application that accesses the physical data on the storage device has a template of the layout, and can retrieve information from certain portions or fields in the data.

In some situations, for example as time passes, the layout of the data needs to be modified. An example of such a situation was the occurrence of the millennium, when the (formerly) accepted way of storing a date code was to use just two digits (i.e., referring to the number of year "after 1900"). As we approached the turn of the millennium to the year 2000, it became apparent that data stored in the two-digit (or equivalent) format would become ambiguous. That is, would the two digits "01" refer to "1901" or would it refer to "2001". The storage of the year data needed to change, as did the software (e.g., application software) that accessed the stored data.

A simple approach to upgrading this sort of configuration required following a procedure to take the primary database "down", then upgrade the software, then rebuild the primary database, then bring the primary database "back online". There are many limitations to this approach, for example:

Unavailability of the Databases: The primary database and any of its backups become unavailable for the period of upgrade (often several hours or more).

All-or-Nothing Impact of Unforeseen Defects Related to the New Software: Upgrades often cause changes in application behavior because the underlying software has changed. By upgrading the primary database in its entirety, that is, in an all-or-nothing manner, the database is susceptible to unintended operation such as might occur as a result of unforeseen software defects. Even when the probability of encountering such defects may be low, the effect can be catastrophic on database availability and/or loss of data.

Other limitations.

A better way is needed. The aforementioned technologies do not have the capabilities to perform database software upgrades while minimizing (or eliminating) downtime, and mitigating the effects of errors that might occur in the transitions to the upgraded database format and database software. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for database software upgrades using a specify-validate-execute protocol in a configuration having a primary database and at least one standby database.

The disclosure resolves aforementioned problems associated with the legacy techniques. As is disclosed in the accompanying figures, an upgrade of a high-availability database can be accomplished concurrently with an upgrade of the database software in an orchestrated manner, minimizing or eliminating the possibility of user errors, and eliminating down time and loss of data.

A method, system, and computer program product are disclosed. The method commences by specifying a subject database configuration state (e.g., an initial state) as well as an upgraded database configuration state (e.g., an upgraded state). Then, the method performs operations for compiling the specifications and validating the upgraded database configuration state with respect to the specified subject database configuration state. Compile errors (if any) are reported, and a user can change the specifications to correct errors in specification, or address compiler warnings. Once the compiler determines that the upgraded configuration state can be reached from the subject database configuration state, then the method generates an upgrade plan. The upgrade plan is executed by a computer-implemented controller. During execution of the plan, the controller pauses for accepting user intervention at key execution points. Further, during execution of the plan, the controller monitors state changes to establish checkpoints. In the event of execution errors detected during the execution of the plan, corrective action reports are output. Some upgrade specifications include both changes to the layout of data in the constituent records, as well as specifications of one or more upgraded versions of software binary images.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing database software upgrades using a specify-validate-execute protocol. More particularly, disclosed herein are environments, methods, and systems for implementing database software upgrades using a specify-validate-execute protocol in a configuration having a primary database and at least one standby database.

Overview

In addition to the aforementioned deficiencies of legacy techniques, there are still further issues that need to be addressed.

Reduce or Eliminate Manual Processes: Legacy techniques required a large number of manual steps to be executed by the user. A more automated approach is disclosed below.

Reduce or Eliminate State-dependent Errors: Legacy techniques prescribed a series of steps to be performed while the database is offline. Other legacy techniques performed some aspects of the upgrade without the database being aware of the fact that the database software is actually getting upgraded in a standby environment. Legacy techniques are vulnerable to user errors and some such user errors may leave the database in an unrecoverable state. An automated recovery mechanism and an automated specify-validate-execute approach is disclosed below.

Reduce Staging Complexity: Execution of manual steps become more complex as the number of standby databases in the configuration increases. The complexity even further increases in some high-reliability configurations, and in some cases one or more high-reliability components need to be staged or otherwise prepared for the upgrade. Thus, in addition to the reducing or eliminating the number of manual steps to be executed by the user, an automated approach to managing the specific sequencing and timing of performing any staging steps is disclosed below.

Validate before Execution: The automated approach herein serves to warn the user about potential anomalies in the desired upgraded configuration that may cause the upgrade to fail. In the disclosure below, the user is given an opportunity to take corrective action on to implement a plan that would eliminate or minimize the likelihood of run-time errors during the upgrade procedures.

Explicitly Provide for Disaster Resilience: The herein-disclosed specify-validate-execute protocol includes many possibilities for recovery after an error or disaster, even in the case that the error or disaster occurs during an upgrade.

Improved Approach

With the above list of issues to be addressed, it becomes apparent that techniques for upgrade are inadequate. The existing method of a "rolling upgrade" consists of a sequence of instructions consisting of various queries which are coordinated by a user with the intent to yield an upgraded database.

The improved approaches address several major problems with legacy approaches: First, the improved approach reduces the granularity of the instructions. Second, the improved approach reduces the number of parallel or redundant instructions pertaining to each standby database. And third, the improved approach reduces the extent of manual intervention.

As previously mentioned, legacy approaches call for users to execute queries at specific sites before and after specific instructions. Troubleshooting while using legacy approaches can be tedious since users are left to peruse alert logs and trace to identify the source of any problems. Moreover, even upon identification of a given problem, users are left to derive how to resume the upgrade procedure. For example, while using legacy approaches, users that may wish to abandon the upgrade and rollback their configuration are left to handle each database individually based on the then current state of the configuration.

The herein-disclosed techniques for improving the legacy techniques operate under an improved regime, the regime including:

A specify-compile-execute upgrade protocol: In a first phase (e.g., in a specification phase), using a computer-aided tool, the user specifies the subject database configuration and the desired outcome (e.g., the state or states after an upgrade) in a specification phase. The desired outcome being specified as an upgraded database configuration state that is deemed to be reachable from the subject database configuration state. For example, an upgraded database configuration state might include partitioning variations of the subject database configuration, or an upgraded database configuration state might include additional redundancy, etc. In a second phase, the computer-aided tool validates the specification (e.g., in a compile-validate phase). The computer-aided tool can validate that the provided subject database specification sufficiently specifies the needed subject database configuration state(s), and the computer-aided tool can validate that the provided upgraded configuration is reachable from the specified subject database configuration state. Further, the computer-aided tool can return an error or warning if the overall upgrade specification (e.g., the subject database configuration specification in combination with the upgraded configuration specification) is inconsistent. The computer-aided tool can return an error or warning if the initial conditions are not valid, or if there is any other barrier to satisfaction of the specified desired outcome (e.g., the specified desired outcome is unreachable or otherwise unachievable). For example, if a user specified a desired outcome that would require more physical storage than was available to that user, then such a validation error would be returned to the user. Alternatively, if no error is found, or if no error rises to a certain level of severity, then the computer-aided tool builds a plan to implement the specification. In a third phase (e.g., in an execution phase) the plan is executed. Some embodiments interject pauses for user intervention at key execution points, such as when a software binary image is to be replaced with a new (upgraded) binary image etc. Exemplary embodiments validate the upgraded configuration state with respect to the specified subject database configuration state. For example, a compile-validate phase can determine if at least one path from the specified subject database configuration state to the upgraded configuration state indeed exists, and that access to the databases involved (e.g., databases in the subject database set as well as databases to be configured in the upgraded configuration) are accessible, and/or will remain accessible as may be needed during the performance of the upgrade procedures.

A database-aware implementation of the upgrade protocol: The database self-awareness keeps track of state changes within the database, and establishes checkpoints so as to provide a way to recover from an upgrade failure. In some cases such a database-aware implementation of the upgrade protocol permits user intervention (or computer-aided intervention) to take corrective action and continue with the rolling upgrade operation. For instance, if the original primary database fails at some point, the only user input that might be needed is to know which database is to become the new, substitute primary database.

DESCRIPTIONS OF EXEMPLARY EMBODIMENTS

Figure 1:
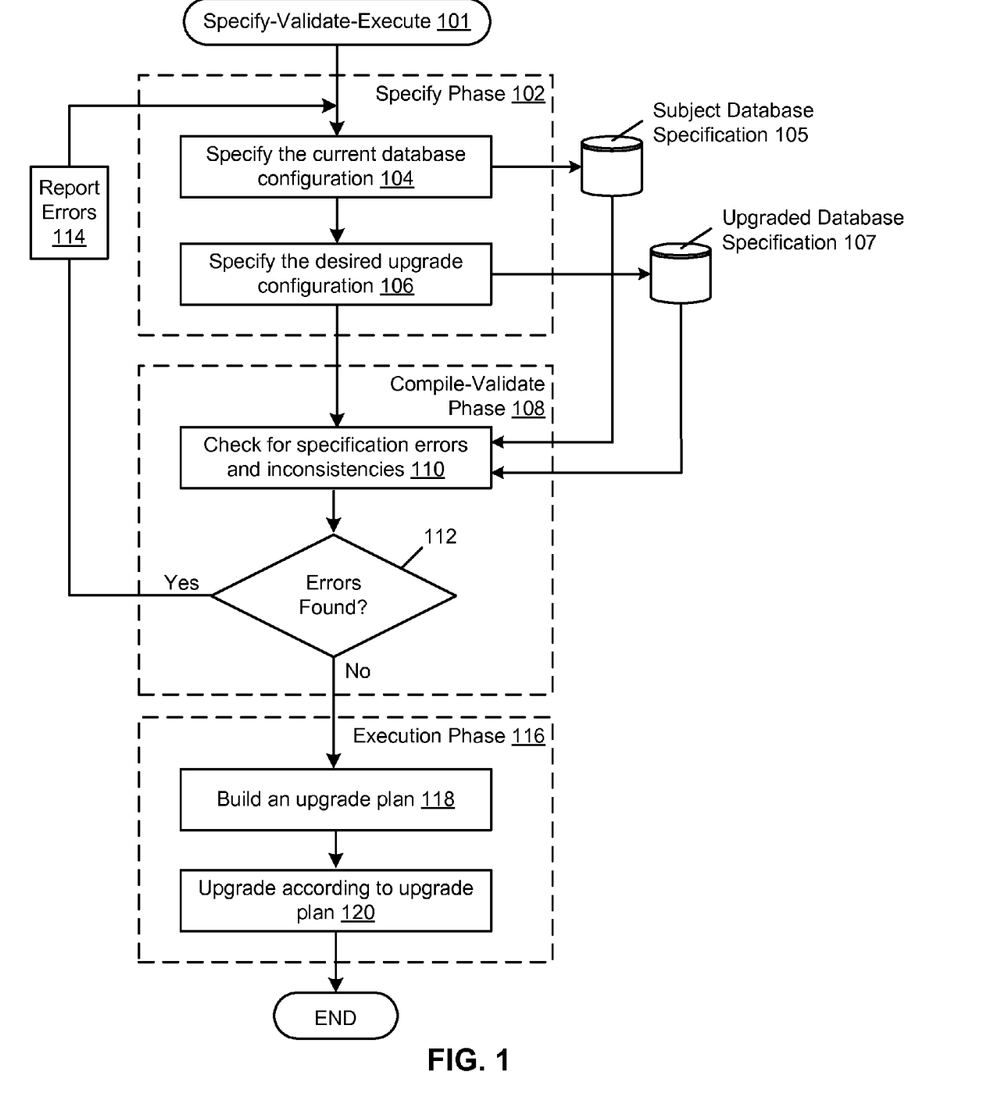
FIG. 1 is an operation chart for managing database software upgrades using a declarative approach, where the declarative approach can be further divided into steps for practicing a specify-validate-execute protocol, according to some embodiments.

FIG. 1 is an operation chart 100 for managing database software upgrades using a specify-validate-execute protocol. As an option, the present operation chart 100 may be implemented in the context of the architecture and functionality of the embodiments described herein. Also, the operation chart 100 or any aspect therein may be implemented in any desired environment.

As shown, the operation chart 100 depicts three phases, namely a specify phase 102, a compile-validate phase 108, and an execution phase 116. The regime commences at a specify-validate-execute entry point 101, and proceeds to the specify phase 102, in which phase a user can specify the current database configuration (see operation 104) as well as specify the desired upgrade configuration (see operation 106). For example, the user might specify a subject database in a directive such as "upgrade the Engineering Department production server database". And the user might specify a particular upgrade end-state in a directive, such as "upgrade to apply the patches listed in the file located at Drive://path/upgrade.txt". Execution of the steps of operation 104 results in directives comprising a subject database specification 105. Similarly, execution of the steps of operation 106 results in the codification of an upgraded database specification 107.

As can be seen, the operation chart proceeds to the compile-validate phase 108, and the specifications (e.g., the subject database specification 105 and the upgraded database specification 107) are read in order to check for specification errors and inconsistencies (see operation 110). If and/or when errors are found (see decision 112) such errors are reported to the user (see operation 114) and the user can return to the specify phase 102 and revise the specifications so as to attempt to remove the compile error. If no errors are discovered in the compile-validate phase 108, then the specifications are deem to be error-free and consistent, at least to the extent that processing proceeds to the execution phase 116. In some embodiments, application of a set of validation rules can detect databases that are incorrectly configured. Or, application of a set of validation rules can detect parameter settings which may present future problems due to values being specified outside of best-practice guidelines.

In the execution phase the computer-aided tool generates an upgrade plan (see operation 118) and proceeds to perform the upgrade in accordance with the upgrade plan (see operation 120). It is possible that run-time errors can occur during the performance of the upgrade. Such errors can occur for a multitude of reasons, including occurrence of disasters during the performance of the upgrade. Such errors are mitigated and/or corrected using techniques that apply to specific situations, which are now briefly discussed:

Fault tolerance: Failures during the rolling upgrade do not automatically result in the abandonment of the upgrade. Events such as the failover to a new primary database or the failover to a logical standby database can be accommodated so that an interrupted upgrade plan can be resumed after correction of the failure and its repercussions.

Configuration rollback: In some cases a user would desire to abort an upgrade. Following the protocol disclosed herein, users can simply return a configuration back to an original, pre-upgrade state.

Centralized monitoring: Many upgrade processes as discussed herein include instrumentation of the operation or operations, and progress and troubleshooting can be performed during the upgrade. In some cases the instrumentation merely serves to output reports progress, while in other situations the instrumentation suggests recommended corrective action(s) to be taken (e.g., by outputting a corrective action report).

Figure 2A:
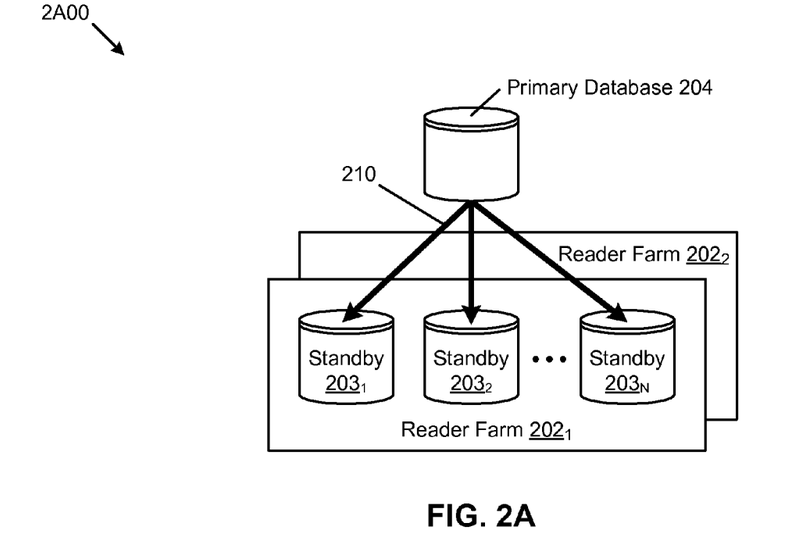
FIG. 2A depicts a high-availability configuration subject to database software upgrades using a specify-validate-execute protocol, according to some embodiments.

FIG. 2A depicts a high-availability configuration 2A00 subject to database software upgrades using a specify-validate-execute protocol. As an option, the present high-availability configuration 2A00 may be implemented in the context of the architecture and functionality of the embodiments described herein. Also, the high-availability configuration 2A00 or any aspect therein may be implemented in any desired environment.

As shown, a high-availability configuration 2A00 may comprise a primary database 204 and any number of standby databases (e.g., standby database $203_1$, standby database $203_2$, standby database $203_N$, etc.). A reader farm (e.g., reader farm $202_1$, reader farm $202_2$, reader farm $202_3$, reader farm $202_4$, reader farm $202_5$, etc.) is comprised of multiple of standby databases (e.g., standby database $203_1$, standby database $203_2$, standby database $203_N$, etc.). A reader farm is used for many purposes, including providing access to read-only data for an application (e.g., report generators, cloners, etc.), and such read-only access can be provided while the primary database is in operation. Another feature of a reader farm in the configuration as shown in the high-availability configuration 2A00 is to provide a redo capability. For example, if a particular standby database were to fail or merely go offline for a duration, the redo transport 210 (multiple redo transports are shown as bold arrows) can be employed to redo transactions from an earlier point in time, thus allowing the failed or temporarily offline standby database to be rebuilt. The standby databases can be used to provide read-only access to the production data, or for application offloading, or for any other read-only purposes.

Figure 2B:
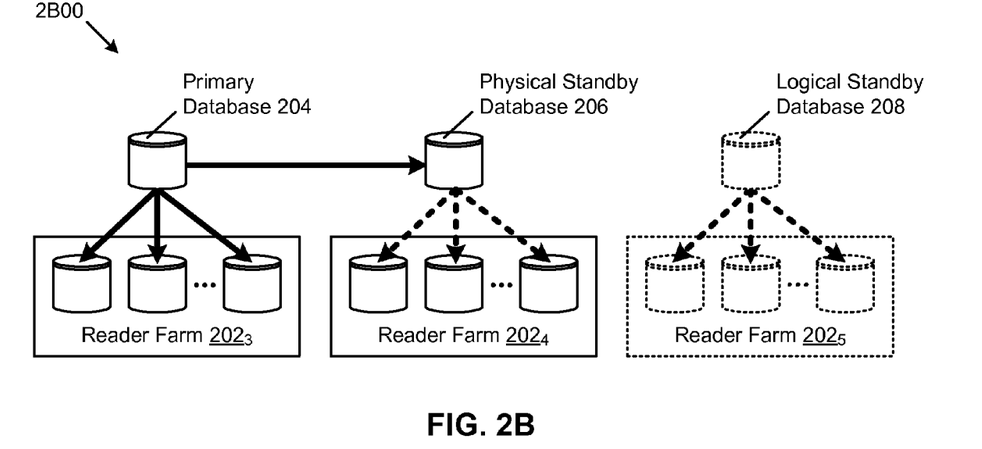
FIG. 2B depicts a high-availability configuration in the process of receiving database software upgrades using a specify-validate-execute protocol, according to some embodiments.

FIG. 2B depicts a high-availability configuration 2B00 in the process of receiving database software upgrades using a specify-validate-execute protocol. As an option, the present high-availability configuration 2B00 may be implemented in the context of the architecture and functionality of the embodiments described herein. Also, the high-availability configuration 2B00 or any aspect therein may be implemented in any desired environment.

The high-availability configuration 2B00 extends the capabilities of the high-availability configuration 2A00. Specifically, the physical standby database 206 receives the primary database's data as is forwarded to them via the redo transport 210 as shown. This environment provides a high degree of redundancy as well as the ability to configure a logical standby database 208 from a physical standby database 206.

The techniques disclosed herein uses physical standby databases to provide backup protection. More specifically, a physical standby database 206 may be designated to protect the logical standby database 208 during the course of the upgrade. In the event of a failure or outage or other unexpected event, the physical standby database can be configured to recover the online redo of a transient instance of a logical standby database rather than from the original primary database. This technique serves to insulate the original primary database from any integrity-compromising event that might occur during an upgrade.

In somewhat more detail, uses of a physical standby database 206 that has been designated to protect the transient logical standby database during the course of the upgrade provides many desirable features, for example:

- The ability for the physical standby database to upgrade together with the upgrade of the transient logical standby database.
- The ability for the physical standby database to assume the role of the transient logical standby database upon such a command.
- The ability to restore its role as a physical standby of the original primary database.
- The ability to provide a physical standby with minimal apply lag time after the switchover. For example, during the lag time during which a physical standby of the transient logical standby is not yet complete, a failover event after the switchover could occur while physical standbys are significantly behind (lagging) in their recovery progress. However, following the techniques disclosed herein, a physical standby of one or more transient logical standby database provides immediate standby protection.

Examples of the above and other features are shown and described in the figures and corresponding text, herein.

Figure 3:
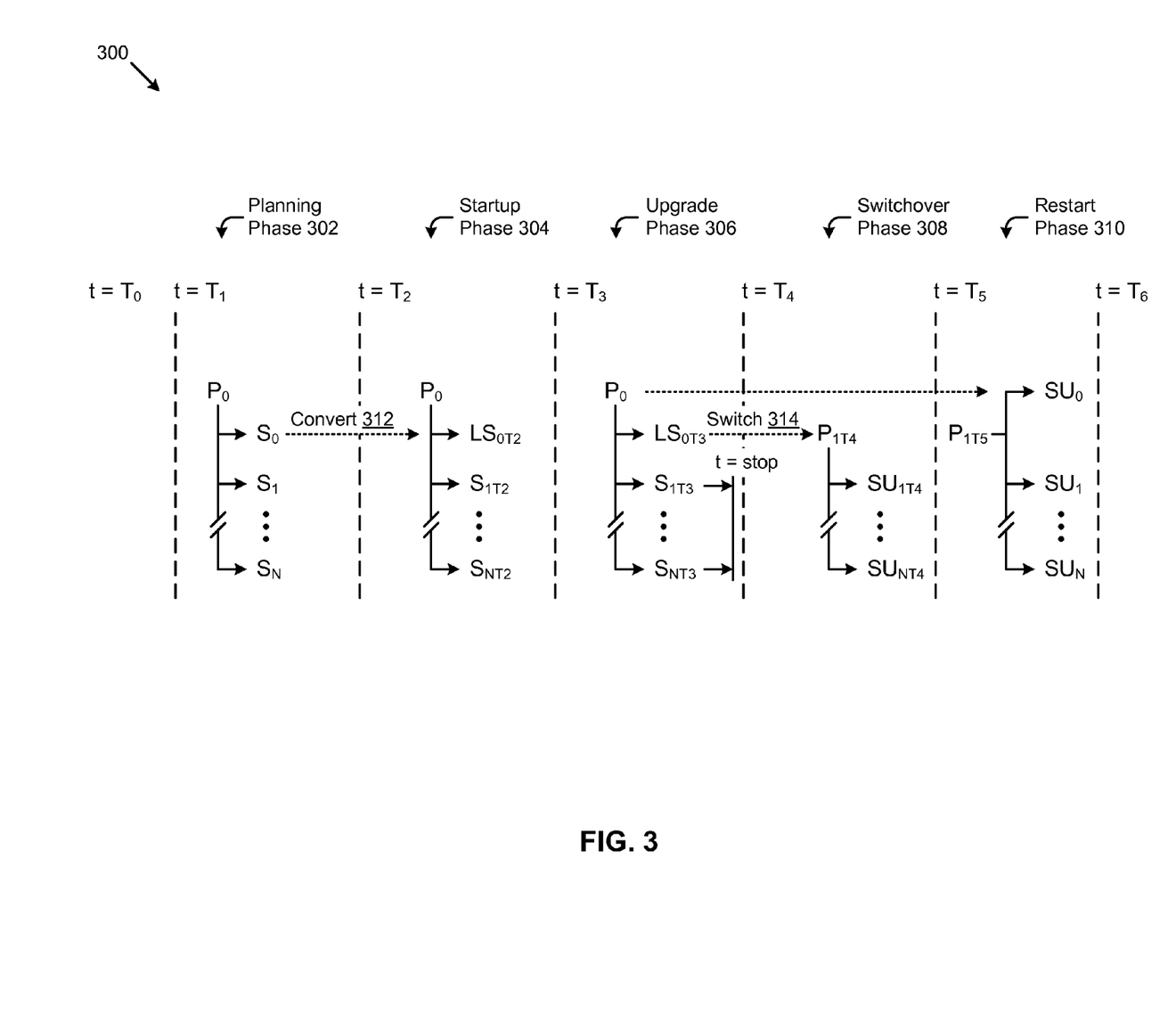
FIG. 3 depicts a time sequence showing the relationships of processes performed during database software upgrades using a specify-validate-execute protocol, according to some embodiments.

FIG. 3 depicts a time sequence 300 showing the relationships of processes performed during database software upgrades using a specify-validate-execute protocol. As an option, the present time sequence 300 may be implemented in the context of the architecture and functionality of the embodiments described herein. Also, the time sequence 300 or any aspect therein may be implemented in any desired environment.

Planning Phase

The time sequence 300 begins at time $t=T_0$ and proceeds through the shown phases to time $t=T_6$. At time $t=T_0$, the database to be upgraded is in normal operation, and in the example given for this particular time sequence 300, the database is already configured as a high-availability configuration, or becomes so configured by time $t=T_1$. In this example, the high-availability configuration comprises a primary database $P_0$, and multiple standby databases (e.g., standby database $S_0$, standby database $S_1$, standby database $S_N$, etc.). Once configured the planning phase 302 commences. This phase consists of activities related to preparing plan parameters and building of the upgrade plan. In some embodiments, any/all of the steps given in the operation chart 100 are performed, and at least some of the aspects of the specify-validate-execute protocol are commenced. One result of the planning phase is the aforementioned upgrade plan, and the upgrade plan guides progression of the upgrade through to the restart phase 310.

Startup Phase

More specifically, a startup phase 304 marks the start of the upgrade. This startup phase 304 comprises activities related to setup such as taking restore points, instantiation of a transient logical standby database, and configuration of standby databases. As shown, one of the high-availability standby databases (see standby database $S_0$) is selected to become a logical standby database (see logical standby database $LS_{0T2}$). Once selected, standby database $S_0$ becomes the subject of a convert operation (see convert 312), which results in a configured instance of a logical standby database (see logical standby database $LS_{0T2}$). The other standby databases (e.g., standby database $S_1$, standby database $S_N$, etc.) continue in their role as standby databases, and their state changes in accordance with the intended operation of a standby database. The time-variant state is shown as standby database $S_{1T2}$ through standby database $S_{NT2}$.

Upgrade Phase

Once the startup phase activities are deemed to have been completed, or at least the startup phase activities are deemed ready for transition to the upgrade activities, the upgrade phase 306 begins. This phase consists primarily of activities related to the upgrade of the database software. In some cases, users control the specific application of the software upgrades. In other cases, the specific application of the software upgrades is computer-aided, and users are only minimally tasked to perform specific application of the software upgrades. Activities to perform specific application of the software upgrades include the upgrade of the database kernel software, upgrade of database application software, application of patches, and automatic or manual startup of the transient logical standby database and automatic or manual startup of the multiple standby databases (e.g., standby database $S_1$, standby database $S_N$, etc.) on the higher version (e.g., upgraded) binary.

Switchover Phase

This switchover phase 308 consists of activities related to the switchover of the transient logical standby into the new primary database. As shown, the logical standby database $LS_{0T3}$ becomes the subject of a switchover operation (see switch 314) which results in a configured instance of a new primary database (see primary database $P_{1T4}$). The other standby databases have been upgraded during the just prior upgrade phase and persist as standby databases (e.g., standby database $SU_{1T4}$ standby database $SU_{NT4}$, etc.) which continue in their role as standby databases in this high-availability configuration.

Restart Phase

This restart phase 310 consists of activities related to the setup of the former primary $P_0$ and any standbys onto the higher version binary. In addition, this group of databases if flashed back via a FLASHBACK DATABASE DDL operation to a point in time just before the creation of logical standby database $LS_{0T2}$. The redo logs produced by the $LS_{0T2}$ are then automatically registered and processed, thereby converting $P_0$ and its associated physical standbys into physical standbys of $LS_{0T2}$.

Finishing Phase

The finishing phase (not shown in FIG. 3) consists of activities related to cleanup of all state from the database necessary to manage this method of rolling upgrade.

Phase Summary

TABLE 1

Description of the rolling upgrade phases

| Step | Phase | Description |
|------|-------|-------------|
| 1 | PLAN | Preparation of the upgrade plan. This corresponds to the specify-validate portions of the aforementioned specify-validate-execute protocol. |
| 2 | START | Start of execution portion of the upgrade. This corresponds to the execute portions of the aforementioned specify-validate-execute protocol. A logical standby database is started. |
| 3 | UPGRADE | Upgrade of the upgraded software and upgrade of database field/record layout. |
| 4 | SWITCH-OVER | Switchover from the logical standby database to become the new primary database. |
| 5 | RESTART | Restart of the former primary database using flash-back and redo to bring the former primary database current with the new primary database. |
| 6 | FINISH | Finishing the upgrade and clean-up. |

In progressing through the phases of Table 1, there are at least three databases that undergo transitions. Those three databases and their respective phase transitions are depicted in FIG. 4.

Figure 4:
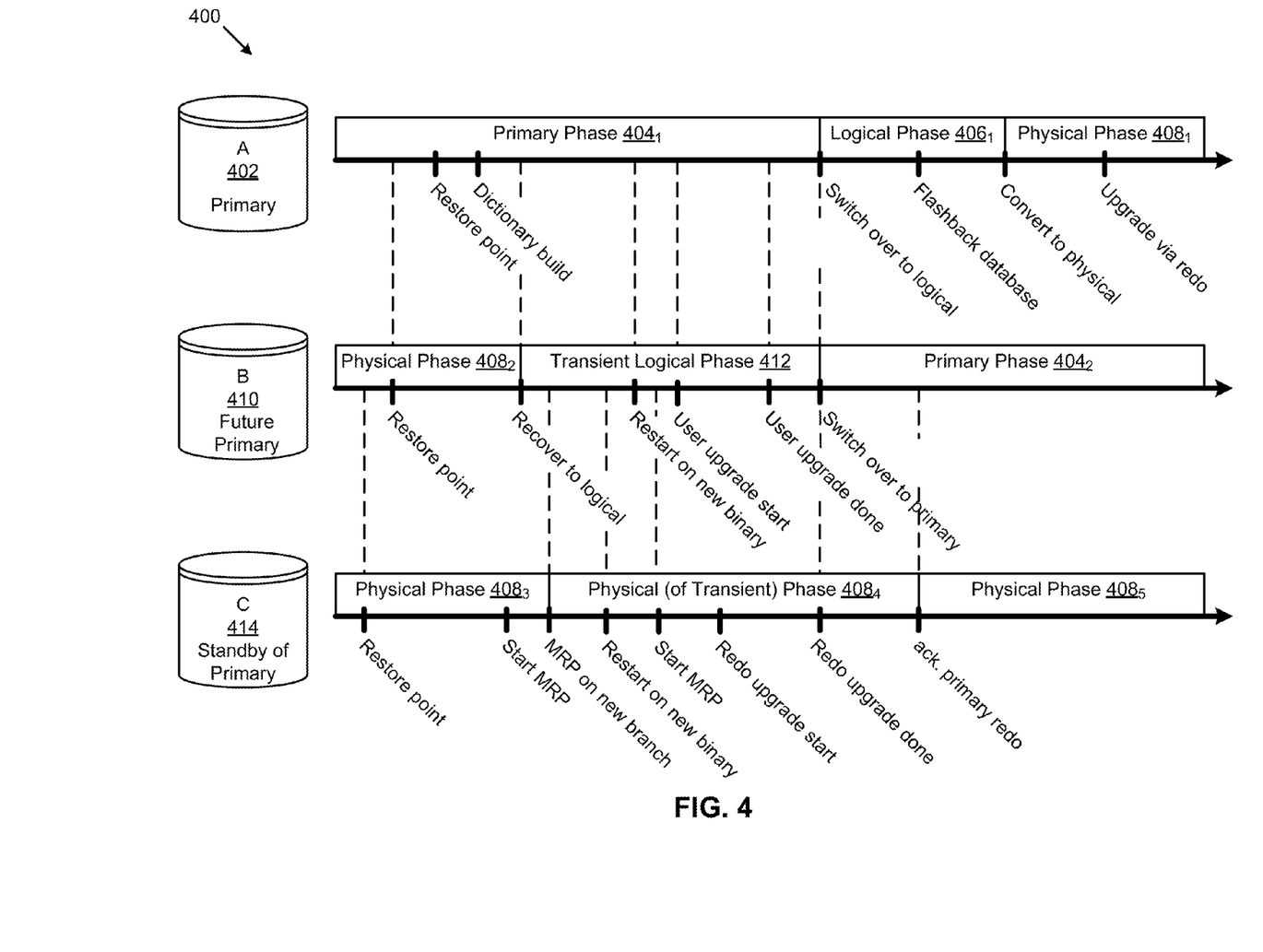
FIG. 4 shows examples of database phase transitions during database software upgrades using a specify-validate-execute protocol, according to some embodiments.

FIG. 4 shows examples of database phase transitions 400 during database software upgrades using a specify-validate-execute protocol. As an option, the present database phase transitions 400 may be implemented in the context of the architecture and functionality of the embodiments described herein. Also, the database phase transitions 400 or any aspect therein may be implemented in any desired environment.

As shown in the upgrade scenario of FIG. 4, the database A 402 is the original primary database, database B 410 is the future primary database, and database C 414 is a standby database of the primary (database A 402) that is converted into a logical standby database. The activities shown for database C are synchronized with activities of database B, and activities shown for database B are synchronized with activities of database A.

Reading the chart beginning from top left, database A 402 is initially in a primary phase $404_1$. A database B 410 is shown as initially in a physical phase $408_2$, and a database C 414 is shown as initially in a physical phase $408_3$. At some point, a restore point is taken for each of the three databases. The database B 410 (which is intended to become a future primary database) is converted into a logical database, and enters its transient logical phase 412. During this phase the upgrade software is applied, and the database B is built up through an earlier captured recovery point. The version (e.g., version number, filename specification, etc.) of an upgraded software binary image can be specified (see specify-validate phase) and corresponding rebuilding is performed based on the upgraded software and database layout. The database A 402 is still the primary at this point, at least until a switchover of the primary to the database B, at which point the database B can "catch up" to the primary (e.g., through a rebuild using redo logs), and once caught up, the database B can assume the role of primary, which is depicted as the transition of database B into its primary phase $404_2$.

Once the database B has assumed the role of primary database, then the former primary database can enter its logical phase $406_1$, during which phase the former primary database A can be subjected to a switchover to logical database, and subjected to a flashback operation, converted to physical database to enter physical phase $408_1$, and upgraded via redo.

During any of the aforementioned phases as shown in FIG. 4, the database C serves as a physical standby of database B. In the event of certain integrity compromising events, database C can serve as a physical copy of the database B, and can be used to restore any portion of database B. Database C 414 persists through several phases such as (as shown) a physical phase $408_3$ where a restore point is captures, and through a physical phase $408_4$, where Database C 414 is restarted based on the upgraded layout and/or based on upgraded software image(s). The Database C persist through yet another phase, namely the physical phase $408_5$, which phase commences when the redo logs of the upgraded primary have been completed and acknowledged by Database C.

Figure 5:
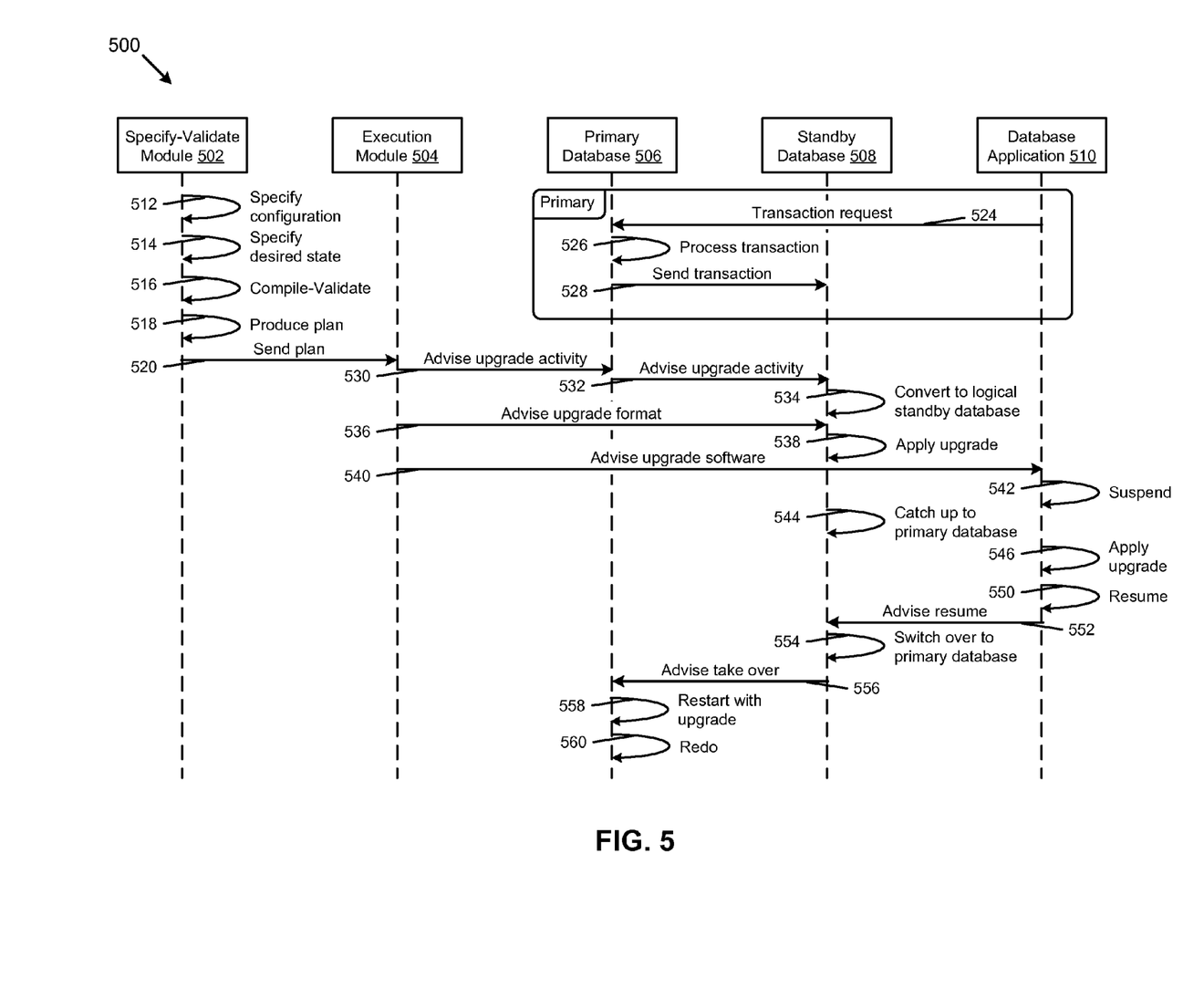
FIG. 5 depicts a messaging protocol for managing database software upgrades using a specify-validate-execute protocol, according to some embodiments.

FIG. 5 depicts a messaging protocol 500 for managing database software upgrades using a specify-validate-execute protocol. As an option, the present messaging protocol 500 may be implemented in the context of the architecture and functionality of the embodiments described herein. Also, the messaging protocol 500 or any aspect therein may be implemented in any desired environment.

As shown, the messaging protocol 500 is executed in an environment comprising a primary database 506, a standby database 508. Other components in this environment include a database application 510 (e.g., an enterprise software application), a specify-validate module 502, and an execution module 504.

In one exemplary embodiment the messaging protocol 500 commences when a user interacts with a specify-validate module 502 to specify a configuration (see operation 512) and to specify a desired state (see operation 514). The user will then initiate compile-validate steps (see operation 516). The output of the compile-validate steps might include error reports (see operation chart 100), in which case the operation 512 and operation 514 might be repeated with remediation. Assuming the compile-validate steps pass, then the specify-validate module serves to produce a plan (see operation 518) which plan is sent to an execution module 504 (see message 520).

Meanwhile, and as shown, the primary database 506 is performing in normal operation. For example, a database application 510 sends a transaction (see transaction request message 524), which transaction is processed by the primary database (see operation 526). In the case that the primary database has a standby database, then the primary database sends a transaction to the standby database 508 (see send transaction message 528).

Now, even while the primary database is in normal operation, the execution module can advise the primary database of impending upgrade activity (see message 530). If the primary database has a sufficient standby database (as shown) then the primary database sends a message to a standby database to advise of the impending upgrade activity (see message 532). Such advice (such as embodied in message 532) informs the standby database to convert into a logical standby (see operation 534), at which point the execution module might send details of the upgrade format (see message 536). Given the contents of the foregoing message, and possibly other information, the standby database can apply the upgrade (see operation 538). In some cases, not only the database formats, but also the database software (e.g., any one or more enterprise software databases) can be upgraded. In one embodiment, a software enterprise application or database application 510 receives advise to upgrade (see message 540), and the software enterprise application or database application 510 might suspend (see operation 542) before applying the upgrade (see operation 546, and then resuming (see operation 550). The software enterprise application or database application 510 might advise the standby database 508 of the act of resumption, for example, via connecting to the database (see message 552). At some point before the standby database 508 switches over (see operation 554) to become a new (upgraded) primary database, the standby database 508 catches up to the primary (see operation 544). Once caught up, the standby database 508 can assume its intended role as a new, upgraded primary database, and the (former) primary database 506 ceases to be the primary (see message 556). The (former) primary database can then itself become upgraded (see restart with upgrade operation 558) and be brought up to date with the new, upgraded primary database by using redo logs (see operation 560).

Additional Embodiments of the Disclosure

Figure 6:
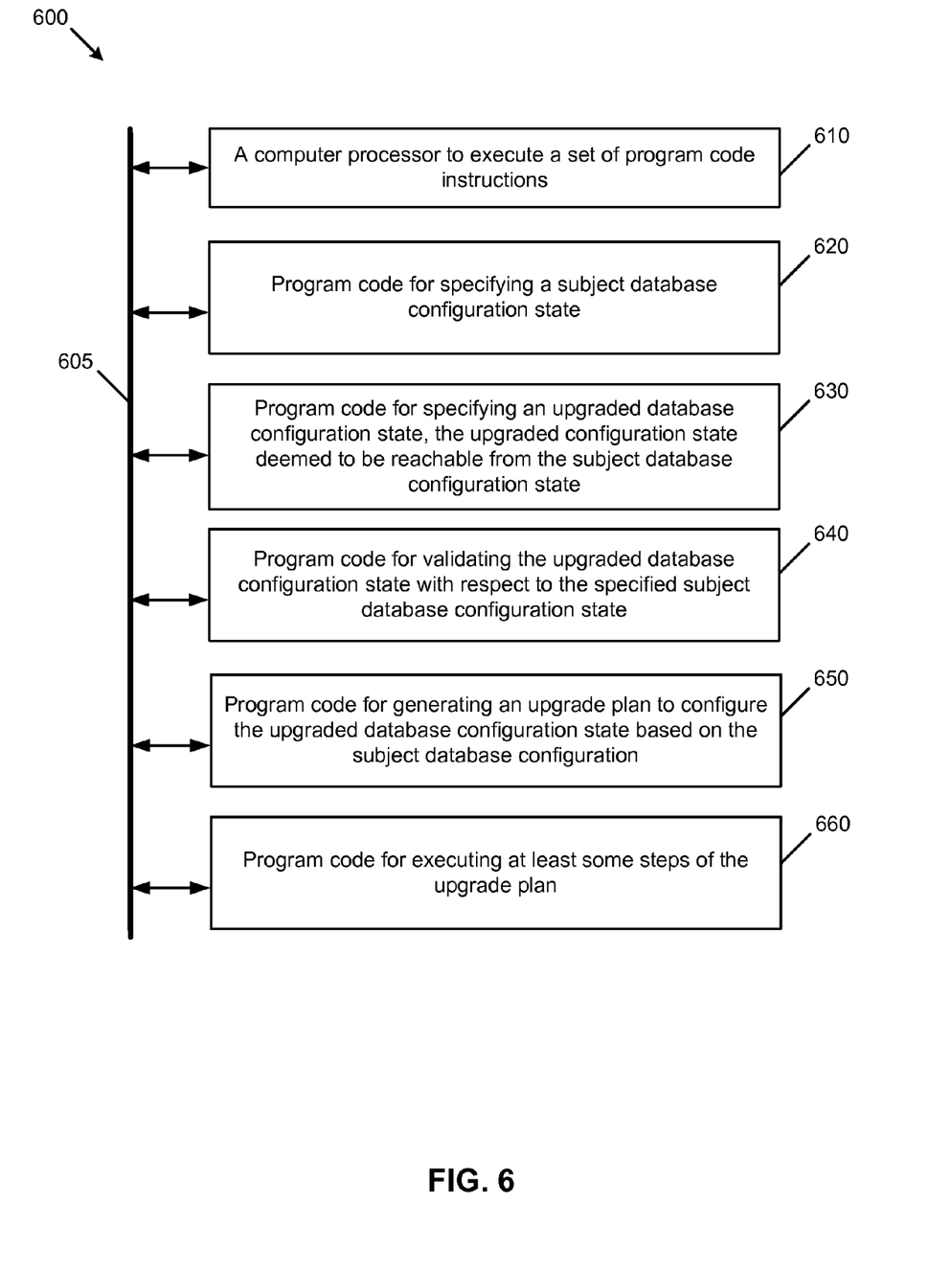
FIG. 6 depicts components of a system for database software upgrades using a specify-validate-execute protocol, according to some embodiments.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: specifying a subject database configuration state having the primary database and the at least one standby database (see module 620); specifying an upgraded database configuration state comprising the at least one standby database, the upgraded configuration state deemed to be reachable from the subject database configuration state (see module 630); validating the upgraded database configuration state with respect to the specified subject database configuration state (see module 640); generating an upgrade plan to configure the upgraded database configuration state based on the subject database configuration (see module 650); and executing at least some steps of the upgrade plan (see module 660).

System Architecture Overview

Figure 7:
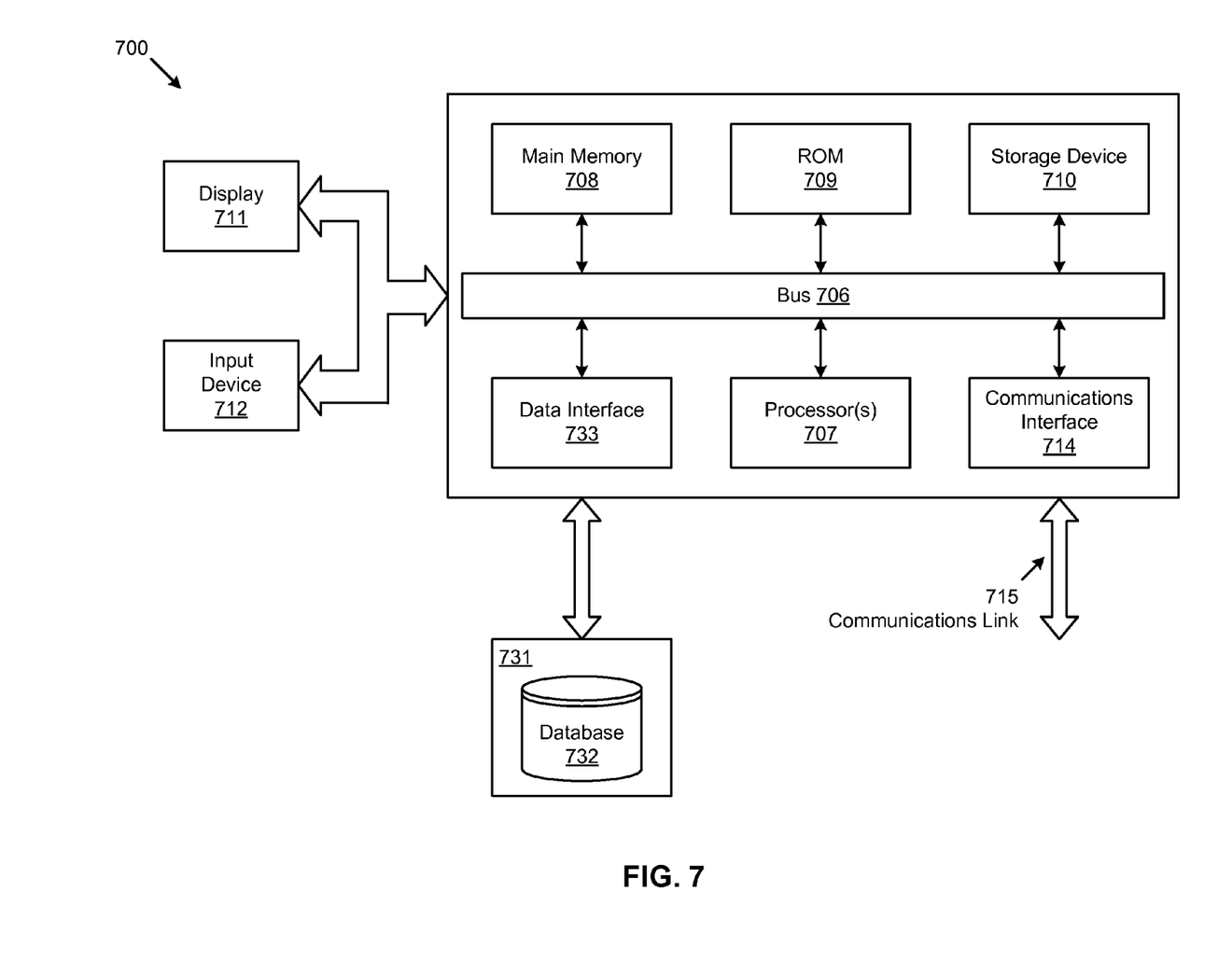
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a main memory 708 (e.g., RAM), a static storage device (e.g., ROM 709), a disk drive storage device 710 (e.g., magnetic or optical disk drive), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in main memory 708. Such instructions may be read into main memory 708 from another computer readable/usable medium, such as ROM 709 or storage device 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as storage device 710. Volatile media includes dynamic memory, such as main memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in storage device 710 or other non-volatile storage for later execution. Computer system 700 may communicate through a data interface 733 to a database 732 on an external data repository 731. A module as used herein can be implemented using any mix of any portions of the main memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for database software upgrades, the method comprising:

specifying a subject database configuration state having a primary database, a first standby database, and a second standby database;

specifying an upgraded database configuration state comprising at least the first standby database, the upgraded database configuration state to be reached from the subject database configuration state;

validating, by a computer, the upgraded database configuration state with respect to the specified subject database configuration state, comprising determining if at least one path exists from the subject database configuration state to the upgraded database configuration state;

generating an upgrade plan to configure the upgraded database configuration state based on the subject database configuration; and executing, by a computer, at least some steps of the upgrade plan, wherein executing at least some steps of the upgrade plan comprises entering a transient logical phase of the first standby database and then upgrading the first standby database before upgrading the primary database, and wherein the second standby database is converted from functioning as a standby for the primary database to function as a standby for the first standby database during the transient logical phase of the first standby database and the upgrade of the first standby database.

2. The method of claim 1, further comprising pausing for user intervention at one or more execution points.

3. The method of claim 1, wherein executing at least some steps of the upgrade plan comprising switching over to the upgraded first standby database as a new primary database when upgrading the primary database.

4. The method of claim 1, wherein executing at least some steps of the upgrade plan comprises upgrading the second standby database before restarting the primary database.

5. The method of claim 1, wherein executing at least some steps of the upgrade plan comprises outputting one or more error reports.

6. The method of claim 5, wherein the one or more error reports comprises a corrective action report.

7. The method of claim 1, wherein the upgraded database configuration state comprises a version of an upgraded software binary image.

8. A computer system for database software upgrades, comprising:
a computer processor to execute a set of program code instructions; and
a memory to hold the program code instructions, in which the program code instructions comprises program code to perform,
specifying a subject database configuration state having a primary database, a first standby database, and a second standby database;
specifying an upgraded database configuration state comprising at least the first standby database, the upgraded database configuration state to be reached from the subject database configuration state;
validating the upgraded database configuration state with respect to the specified subject database configuration state, comprising determining if at least one path exists from the subject database configuration state to the upgraded database configuration state;
generating an upgrade plan to configure the upgraded database configuration state based on the subject database configuration; and
executing at least some steps of the upgrade plan, wherein executing at least some steps of the upgrade plan comprises entering a transient logical phase of the first standby database and then upgrading the first standby database before upgrading the primary database, and wherein the second standby database is converted from functioning as a standby for the primary database to function as a standby for the first standby database during the transient logical phase of the first standby database and the upgrade of the first standby database.

9. The computer system of claim 8, wherein the program code instructions further perform pausing for user intervention at one or more execution points.

10. The computer system of claim 8, wherein executing at least some steps of the upgrade plan comprising switching over to the upgraded first standby database as a new primary database when upgrading the primary database.

11. The computer system of claim 8, wherein executing at least some steps of the upgrade plan comprises upgrading the second standby database before restarting the primary database.

12. The computer system of claim 8, wherein executing at least some steps of the upgrade plan comprises outputting one or more error reports.

13. The computer system of claim 12, wherein the one or more error reports comprises a corrective action report.

14. The computer system of claim 8, wherein the upgraded database configuration state comprises a version of an upgraded software binary image.

15. A computer program product embodied in a non-transitory computer readable medium, the computer readable medium having stored thereon a sequence of instructions which, when executed by a processor causes the processor to execute a process to implement database software upgrades, the instructions comprising:
instructions for specifying a subject database configuration state having a primary database, a first standby database, and a second standby database;
instructions for specifying an upgraded database configuration state comprising at least the first standby database, the upgraded database configuration state to be reached from the subject database configuration state;
instructions for validating, by a computer, the upgraded database configuration state with respect to the specified subject database configuration state, comprising determining if at least one path exists from the subject database configuration state to the upgraded database configuration state;
instructions for generating an upgrade plan to configure the upgraded database configuration state based on the subject database configuration; and
instructions for executing, by a computer, at least some steps of the upgrade plan, wherein executing at least some steps of the upgrade plan comprises entering a transient logical phase of the first standby database and then upgrading the first standby database before upgrading the primary database, and wherein the second standby database is converted from functioning as a standby for the primary database to function as a standby for the first standby database rather than for the primary database during the transient logical phase of the first standby and the upgrade of the first standby database.

16. The computer program product of claim 15, further comprising instructions for pausing for user intervention at one or more execution points.

17. The computer program product of claim 15, wherein executing at least some steps of the upgrade plan comprising switching over to the upgraded first standby database as a new primary database when upgrading the primary database.

18. The computer program product of claim 15, wherein executing at least some steps of the upgrade plan comprises upgrading the first standby database and upgrading the second standby database before restarting the primary database.

19. The computer program product of claim 15, wherein executing at least some steps of the upgrade plan comprises outputting one or more error reports.

20. The computer program product of claim 19, wherein the one or more error reports comprises a corrective action report.

* * * * *